B. Slusser,
Excavator.
No. 104,782. Patented June 28, 1870.

Witnesses:
Victor Hagmann
C. A. Pettis

Inventor:
B. Slusser
per Munn & Co
Attorneys.

United States Patent Office.

BENJAMIN SLUSSER, OF SIDNEY, OHIO.

Letters Patent No. 104,782, dated June 28, 1870.

IMPROVEMENT IN EXCAVATORS.

The Schedule referred to in these Letters Patent and making part of the same.

*To all whom it may concern:*

Be it known that I, BENJAMIN SLUSSER, of Sidney, in the county of Shelby and State of Ohio, have invented a new and useful Improvement in Excavators; and I do hereby declare that the following is a full, clear, and exact description of the same, reference being had to the accompanying drawing forming a part of this specification, in which—

Figure 1:
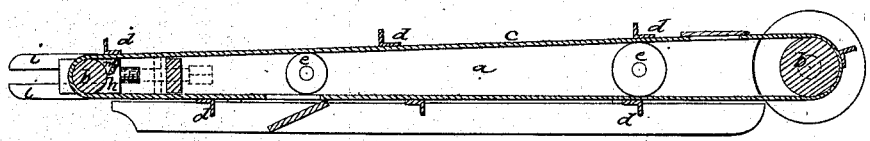
Figure 2:
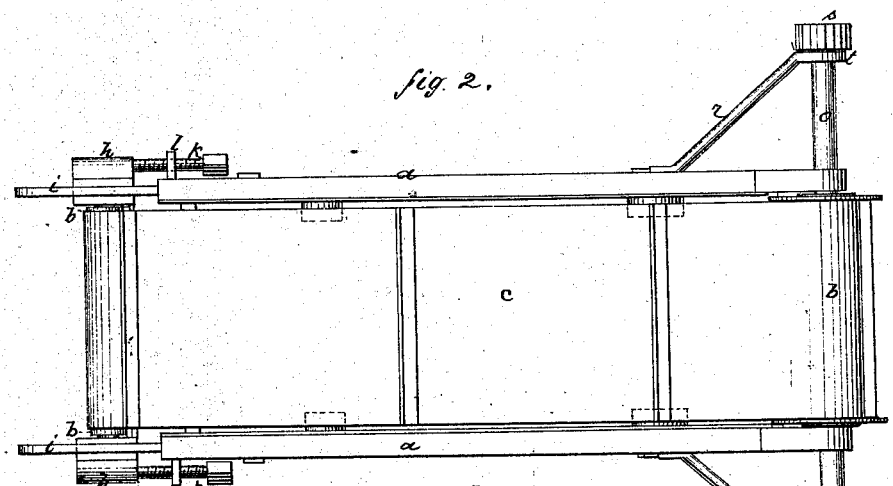
Figure 3:
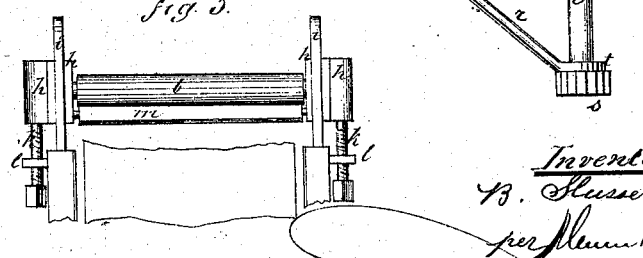

Figure 1 is a longitudinal vertical section;
Figure 2 is a plan view; and
Figure 3 is a detached plan of the scraper end of the apparatus, the elastic apron being removed.

This invention consists, mainly, in a scraper placed by the side of one of the rollers over which the endless apron runs, so as to clear the same of dirt, said scraper being attached, at its ends, to the boxes in which the rollers are mounted, so that, whenever the boxes, with the rollers, are moved in one direction or the other in the frame, the scrapers are moved also to the same extent, and always preserve the same position relative to the rollers.

In the drawing—

$a\ a$ are the side pieces of the apron-frame.
$b\ b$, the end rollers, over which the apron runs.
$c$, the apron, made of India rubber.
$d\ d$, &c., scrapers attached transversely of the apron.
$e\ e$, &c., rollers mounted on the inner sides of the pieces $a$, for the support of the apron and scrapers.
$h\ h$, boxes, in which are placed the journals of the smaller roller $b$.
These boxes are movable between the branches $i\ i$ of the forked ends of the pieces $a$.
Set-screws $k\ k$ passing through ears $l\ l$, standing out from the side pieces $a$, bear against the ends of the boxes $h$.

On turning the set-screws $k$ forward, the boxes $h$ are pressed outward, and the apron tightened; hence the boxes and screws are always in contact.

The scraper is shown at $m$. It is placed close beside the roller $b$, with its ends in the boxes $h$, and keeps the roller always clear.

The scraper moves with the boxes, and always preserves the same relative position to the roller $b$.

Holes are cut in the apron, and flaps $n$ attached over the holes.

The flaps hang down when passing along the under side of the apron, and allow the dirt cleaned from the rollers by the scrapers to fall through.

The shaft $o$ of the larger roller $b$ extends beyond each of the side pieces $a$, and is braced by stays $r\ r$, and bears pinions $s\ s$ at its ends, and collars $t\ t$, one near each pinion, said collars being provided with arms, to which levers, for lifting the pinions out of gear, are attached.

Having thus described my invention,
What I claim as new, and desire to secure by Letters Patent, is—

The scraper $m$, when mounted in the same sliding boxes, $h$, in which are placed the journals of the roller $b$, in the manner described, and for the purpose of keeping the scrapers in the same relative position to the rollers.

BENJAMIN SLUSSER.

Witnesses:
G. D. LECKEY,
C. ENGLISH.